United States Patent
Alland et al.

[11] Patent Number: 6,002,983
[45] Date of Patent: Dec. 14, 1999

[54] ANGLE EXTENT ESTIMATION METHOD FOR A MOTOR VEHICLE OBJECT DETECTION SYSTEM

[75] Inventors: Stephen William Alland; James Fredrick Searcy; Kevin Ray Wherry, all of Tucson, Ariz.

[73] Assignee: Delphi Technologies, Inc., Troy, Mich.

[21] Appl. No.: 08/968,737

[22] Filed: Aug. 27, 1997

[51] Int. Cl.[6] .............................. G06F 17/10; G01S 13/00
[52] U.S. Cl. ......................... 701/301; 701/300; 342/70; 342/71
[58] Field of Search ................................. 701/301, 208, 701/300, 302; 342/69, 70, 36, 456, 71, 107; 382/291, 103, 104; 356/376

[56] References Cited

U.S. PATENT DOCUMENTS

| | | | |
|---|---|---|---|
| 4,054,878 | 10/1977 | Diehl | 342/142 |
| 5,585,798 | 12/1996 | Yoshioka et al. | 342/70 |
| 5,606,534 | 2/1997 | Stringer et al. | 367/128 |
| 5,689,264 | 11/1997 | Ishikawa et al. | 342/70 |
| 5,757,501 | 5/1998 | Hipp | 356/376 |
| 5,767,803 | 6/1998 | Yamada | 342/69 |
| 5,850,370 | 12/1998 | Stringer et al. | 367/128 |
| 5,892,855 | 4/1999 | Kakinami et al. | 382/291 |

*Primary Examiner*—Jacques H. Louis-Jacques
*Attorney, Agent, or Firm*—Jimmy L. Funke

[57] ABSTRACT

A method of operation for a motor vehicle object detection system is described, in which the extent angle of an identified target is accurately determined by applying a point source scatterer identification technique to data at the periphery of a composite return. Return amplitude data from one or more complete scans of the sensor beam are collected and compared with a target threshold to identify objects in the viewing angle, thereby forming an array of amplitude data associated with successive beam positions for each identified object. In each array, the left-most and right-most pair of amplitude data points associated with successive beam positions are selected and individually used to compute the angle of a point source scatterer which would be responsible for that data pair. The computed scatterer angles are taken as the left and right edges of the target and used to determine the angle extent of the identified object, which in turn, enables reliable determination as to whether the identified object is in or out of the vehicle travel path, and what, if any, vehicle response is appropriate to maintain a given headway or avoid a collision with the object.

8 Claims, 4 Drawing Sheets

ANGLE EXTENT ESTIMATION METHOD FOR A MOTOR VEHICLE OBJECT DETECTION SYSTEM

This invention relates to a motor vehicle object detection system including a scanned beam sensor, and more particularly to a method of operation that accurately estimates the extent angle of an identified object.

BACKGROUND OF THE INVENTION

Motor vehicle object detection systems typically include a high frequency transceiver, a scanning antenna, a signal processor and a vehicle operation system that initiates a warning or evasive vehicle operation. The antenna is designed to project a narrow energy beam, and a scanning device (which may be either mechanical or electronic) scans the beam back and forth through a viewing angle that includes the vehicle travel path angle. The signal processor analyses the amplitude of the beam reflections, or returns, to identify objects in the vehicle travel path. The object detection system may be part of a more comprehensive control system such as a intelligent cruise control system that adjusts the vehicle speed to maintain a given timed headway to the closest in-path vehicle, or a collision avoidance system that warns the driver of an impending collision or initiates an evasive action to avoid a collision. Warnings may be audible or visual, and the vehicle control actions may include braking, engine throttle control, and evasive steering.

Accurate knowledge of the extent, or width, of an identified object is required to determine if the object lies in or out of the vehicle travel path. Accurate assessment of the object extent is often difficult, particularly with large and/or multiple objects which result in a wide angle, composite return. Conventional extent estimation methods based on amplitude thresholds are arbitrary by definition, and generally not sufficiently accurate or reliable.

SUMMARY OF THE PRESENT INVENTION

The present invention is directed to an improved method of operation for a motor vehicle object detection system, wherein the extent angle of an identified target is accurately determined by applying an extrapolative point source scatterer identification technique to data at the periphery of a composite return. In accordance with the method of this invention, return amplitude data from one or more complete scans of the sensor beam are collected and compared with a target threshold to identify objects in the viewing angle, thereby forming an array or profile of amplitude data associated with successive beam positions for each identified object. In each array, the left-most and right-most pair of amplitude data points associated with successive beam positions are selected and individually used to compute the angle of a point source scatterer which would be responsible for that data pair. The computed scatterer angles are taken as the left and right corners of the target and used to determine the angle extent of the identified object.

The determination of the point source scatterer angles is achieved using a sequential lobing angle estimation technique. While sequential lobing has previously been used to interpolate between successive beam returns for identifying an isolated point scatterer, this invention utilizes sequential lobing in a novel way as described above to extrapolate successive peripheral returns to locate a scatterer beyond the peripheral returns as a means of identifying the edges, and hence extent angle, of a large object or objects characterized by a composite return. As demonstrated herein, the method of this invention provides an accurate estimation of object angle extent, enabling a reliable determination as to whether the identified object is in or out of the vehicle travel path. This information, in turn, is then used to determine what, if any, vehicle response is appropriate to maintain a given headway or avoid a collision with the object.

BRIEF DESCRIPTION OF THE DRAWINGS

FIG. 2 pictorially depicts the host motor vehicle and the multiple targets, while FIG. 3 graphically depicts a resulting amplitude return profile.

FIG. 5 depicts a high level flow diagram, and FIG. 6 depicts a portion of the high level flow diagram in more detail.

DETAILED DESCRIPTION OF THE DRAWINGS

Figure 1:
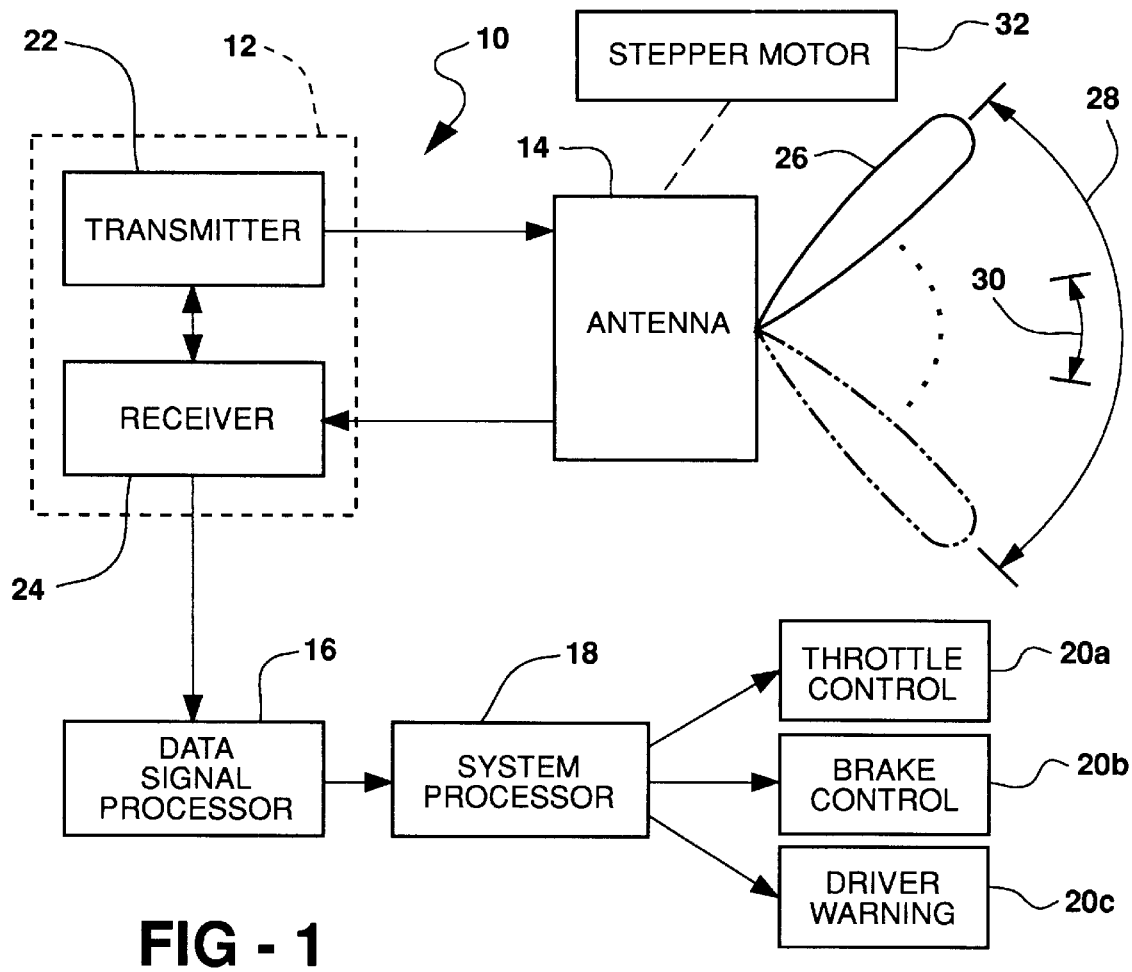
FIG. 1 is a block diagram of a motor vehicle object detection system, including a signal processor for identifying and characterizing objects in accordance with this invention.

Referring to the drawings, and particularly to FIG. 1, the reference numeral 10 generally designates a motor vehicle object detection system including a high frequency transceiver 12, an antenna 14, a signal processor 16, a system processor 18 and three different vehicle response systems 20a–20c. The transceiver includes a transmitter 22 for coupling high frequency energy to the antenna 14, and a receiver 24 for receiving reflected energy returns from antenna 14 or a separate receiver antenna for processing by signal processor 16. The antenna 14 is designed to project a narrow energy beam which is scanned in successive steps through a viewing angle forward of the vehicle, as designated by the arc 28. In the illustrated embodiment, the antenna 14 is mechanically scanned in uniform increments of ¼ beamwidth by a stepper motor 32 mechanically coupled to the antenna 14. However, the beam may be scanned in non-uniform or different-sized increments, if desired. Additionally, it will be appreciated that other scanning mechanisms or electronic scanning may alternatively be utilized.

The reflected energy returns received by receiver 24 are passed on to signal processor 16, which analyzes the amplitude of the returns to identify any objects or targets within the viewing angle 28, and if possible, to characterize and resolve such objects as being either in or out of the vehicle travel path, represented by the smaller arc 30 within the viewing angle 28. The system processor 18 receives the object information from signal processor 16, tracks the identified objects, and determines what, if any, vehicle response is appropriate. For example, if an identified object is determined to present only a minor risk of collision, an audible and/or visible driver warning, as represented by the vehicle response system 20c, may be appropriate. In a higher risk situation, the system processor 18 may choose to close the engine throttle, overriding the driver or cruise control system, as represented by the vehicle response system 20a.

Alternatively or additionally, the system processor 18 may activate the vehicle brakes, as represented by the vehicle response system 20b. However, the nature and extent of vehicle response selected by the system processor 18 is irrelevant to the present invention, which is particularly directed to the operation of signal processor 16, described below.

Figure 2:
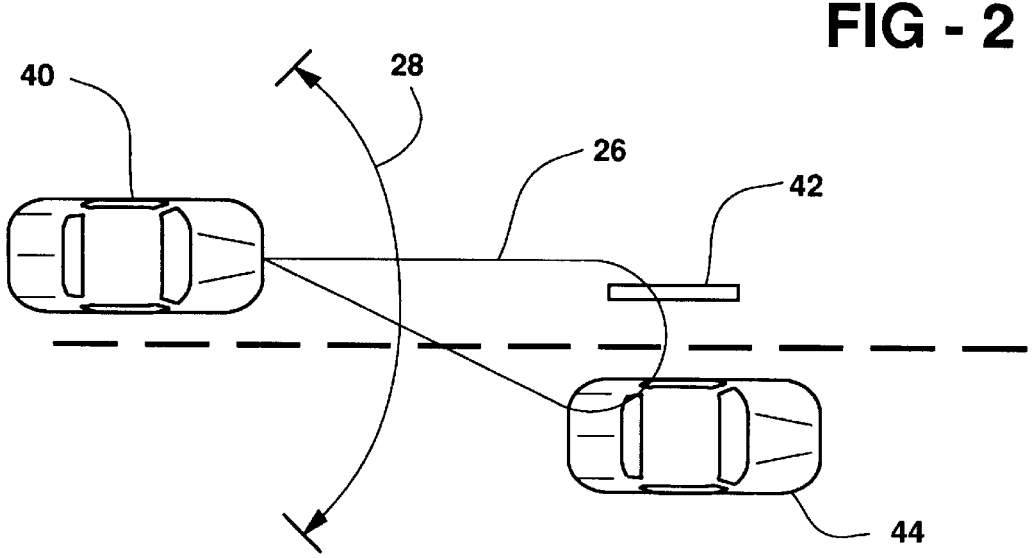
FIGS. 2 and 3 pictorially and graphically illustrate a stressing scenario involving multiple objects in the sensor viewing angle for the system of FIG. 1.

FIG. 2 pictorially depicts an exemplary stressing scenario where a host vehicle 40 (that is, a vehicle in which object detection system 10 is installed) traveling in the left lane of a two or more lane highway follows a pair of target vehicles: a motorcycle 42 in the left lane and a car or truck 44 in the right lane. It is assumed that the vehicles 42 and 44 are traveling at the same speed so that both have the same range and range rate, as viewed by the host vehicle 40. As in FIG. 1, the beam 26 of the host vehicle 40 is swept back and forth in successive steps through the viewing angle 28. In the illustrated example, the target vehicles 42 and 44 are sufficiently close to each other in azimuth angle relative to the width of beam 26 that only a single target or object can be identified by the signal processor 16. In other words, the target vehicles 42 and 44 cannot be resolved into individual targets, and instead, are merged into a single composite target. Moreover, the angle centroid of the composite target may be out of the vehicle travel path even though the vehicle 42 is in the travel path. Another type of scenario where target resolution is difficult occurs when the host vehicle is approaching a large vehicle in the adjacent lane, resulting in a return signal wide enough to extend into the host vehicle's travel path even though no in-path target is actually present.

Figure 3:
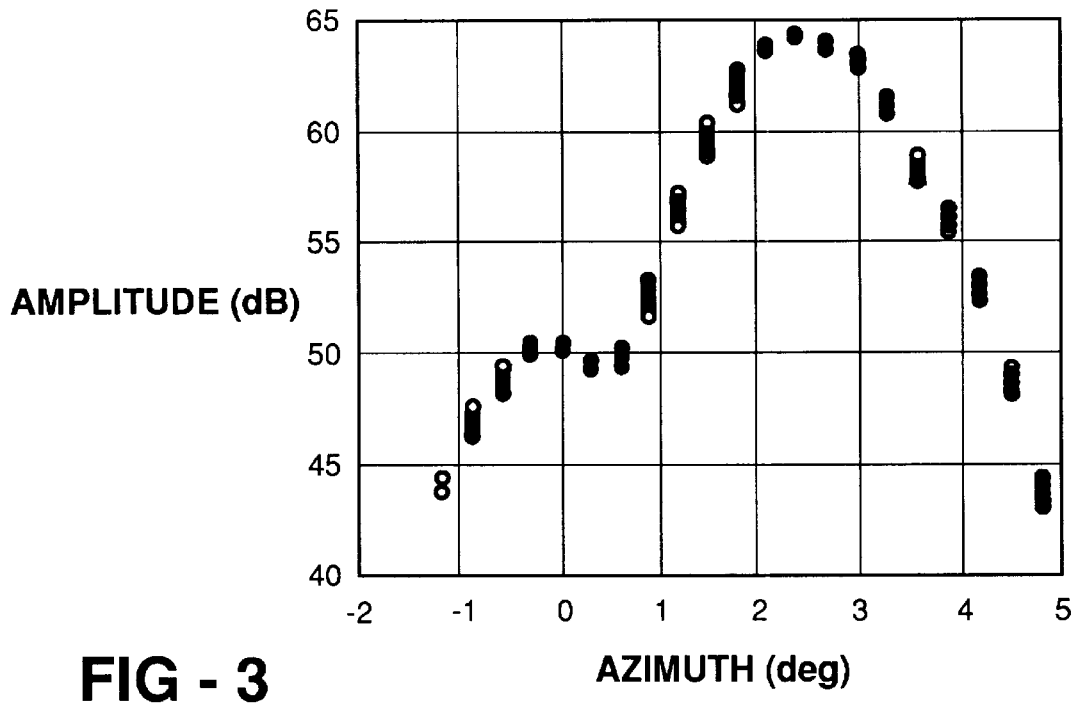

FIG. 3 is a graph of return signal amplitude data for the azimuth angle of each beam position for the scenario depicted in FIG. 2. The amplitude data for each beam position represents a composite of relevant data obtained in approximately twenty successive scans of the viewing angle 28. As seen in FIG. 3, the peak return from the motorcycle 42 is about 15 dB below the car 44, and the return is not resolved into two individual targets.

According to this invention, the determination as to whether an identified target is in or out of the vehicle travel path is made by accurately assessing the azimuth extent of the identified target and checking for coincidence with the vehicle travel path. An accurate assessment of the azimuth extent of the identified target is achieved by grouping the return data amplitude values in an array or profile such as depicted in FIG. 3, using a sequential lobing technique to identify a first point source scatterer angle that would produce the amplitude data obtained for the two left most beam positions in the array and a second point source scatterer angle that would produce the amplitude data obtained for the two right-most beam positions in the array, and defining the target extent as being bounded by such first and second point source scatterer angles. If the return array is truly from a single point source, the technique will yield a zero extent angle at the correct azimuth since the left and right scatterer angles will coincide at the angle of the point source. The sequential lobing technique is based on the ratio of the return amplitudes of two beam positions, and by using data from the two left-most and right-most beam positions, error caused by the influence of target scatterers other than the left and right edge scatterers is minimized.

The relative amplitude returned from any given beam position for a point source scatterer—that is, $V/V_p$, where V is the received amplitude and $V_p$ is the amplitude that would be received if the beam were directed precisely at the point source scatterer—is given by the expression:

$$V/V_p = g(\theta_{beam}, \theta_s, \theta_{bw}) \qquad (1)$$

where $\theta_{beam}$ is the pointing angle of the given beam, $\theta_s$ is the angle of the point source scatterer, $\theta_{bw}$ is the half-power width of the beam and g is a sensor beam pattern function. Based on expression (1), the ratio of the return amplitudes $V_j$ and $V_i$ received from two successive beam positions j and i, respectively, is given as:

$$V_j/V_i = [g(\theta_j, \theta_s, \theta_{bw})]/[g(\theta_i, \theta_s, \theta_{bw})] \qquad (2)$$

where $\theta_j$ is the angle of beam position j and $\theta_i$ is the angle of beam position i. The amplitude difference, or $\text{Delta}_{ji}$, may be given as:

$$\text{Delta}_{ji} = \log(V_j/V_i) = \log[g(\theta_j, \theta_s, \theta_{bw})] - \log[g(\theta_i, \theta_s, \theta_{bw})] \qquad (3)$$

Typically, the angle $\theta_s$ of the point source scatterer cannot be determined in closed form, but instead a second-order polynomial approximation of the following form is used:

$$\theta_s = \theta_m + K_1(\text{Delta}_{ji})^2 + K_2(\text{Delta}_{ji}) \qquad (4)$$

where $\theta_m$ is the midpoint between $\theta_i$ and $\theta_j$, and the coefficients $K_1$ and $K_2$ are constants which depend on the beam pattern and width (that is, the function "g"). Frequently, a first-order approximation (that is, $K_1=0$) will provide sufficient accuracy.

In determining the locations of the right and left edge scatterers, a sign convention of positive from left to right is assumed. Thus, the angles $\theta_L$ and $\theta_R$ of the left and right edge scatterers—ie, the left and right edges of the identified object—are determined as follows:

$$\theta_L = \theta_{ml} + [K_1(\text{Delta}_{left})^2 + K_2(\text{Delta}_{left})], \text{ and} \qquad (5)$$

$$\theta_R = \theta_{mr} - [K_1(\text{Delta}_{right})^2 + K_2(\text{Delta}_{right})]. \qquad (6)$$

where $\theta_{ml}$ and $\theta_{mr}$ are the azimuth angles of the midpoint between the two left-most and two right-most beam positions in the array of returns, $K_1$ and $K_2$ are constants, and $\text{Delta}_{left}$ and $\text{Delta}_{right}$ are the left and right amplitude differences. The left and right amplitude differences $\text{Delta}_{left}$ and $\text{Delta}_{right}$, in turn, are given by the expressions:

$$\text{Delta}_{left} = \log[(V_{left+1})/(V_{left})], \text{ and} \qquad (7)$$

$$\text{Delta}_{right} = \log[(V_{right-1})/(V_{right})] \qquad (8)$$

where $V_{left}$ and $V_{left+1}$ are the return amplitudes of the left-most and next to left-most beam positions, and $V_{right}$ and $V_{right-1}$ are the return amplitudes of the right-most and next to right-most beam positions.

Figure 5:
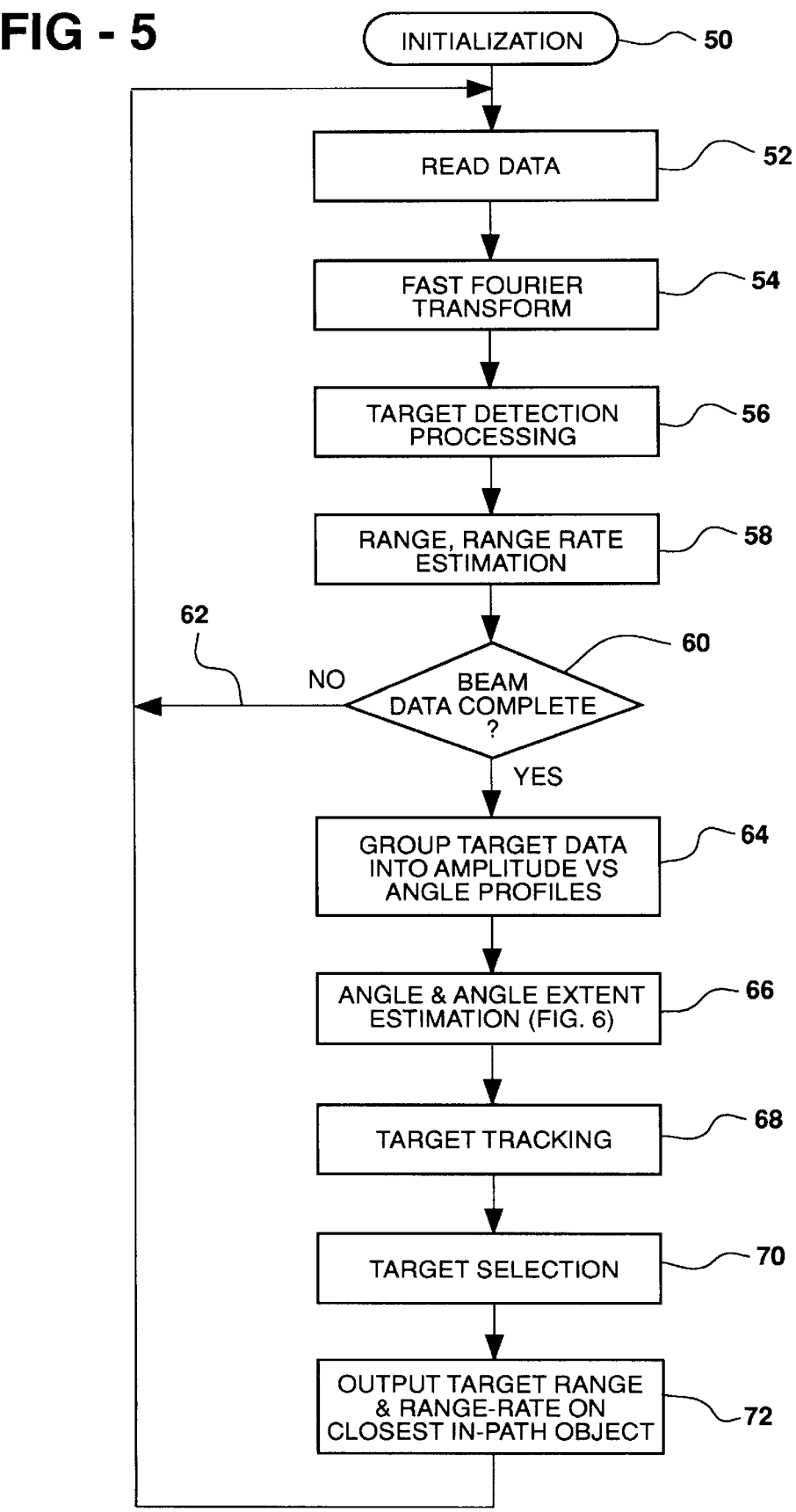
FIGS. 5 and 6 depict flow diagrams representative of computer program instructions executed by the signal processor of FIG. 1 in carrying out the method of operation of this invention.
Figure 6:
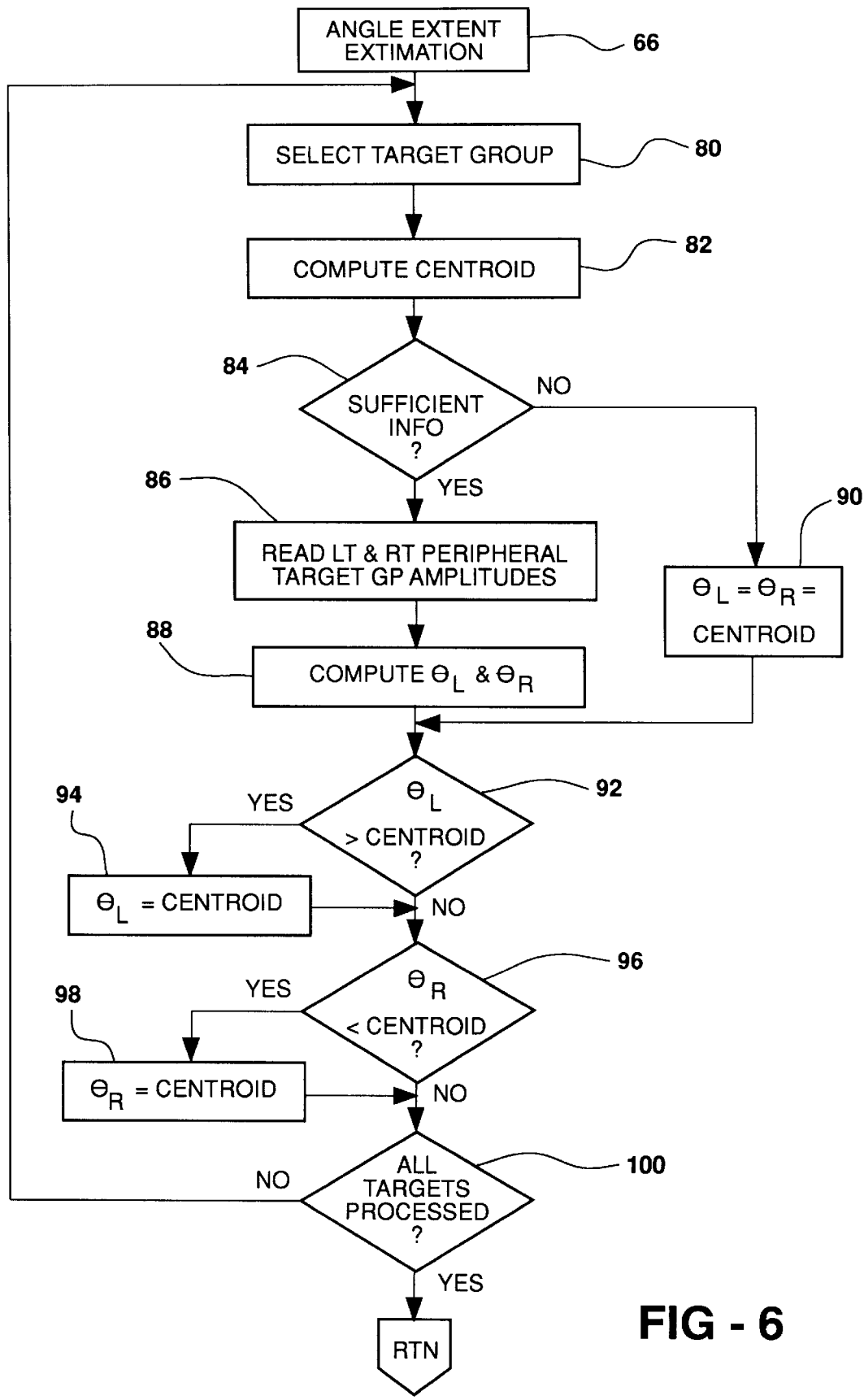

The flow diagrams of FIGS. 5–6 represent computer program instructions executed by the signal processor 16 of FIG. 1 in carrying out the method of this invention. FIG. 5 describes the operation of signal processor 16 in general, while FIG. 6 gives further detail in respect to the portions most relevant to the present invention.

Referring to FIG. 5, the block 50 designates initialization routine in which various parameters and variables used in the routine are initialized to predefined values and states. Blocks 52–58 designate a series of conventional processing steps which are repeated for each beam position in a given scan, as indicated by the block 60 and return line 62. Such processing steps include reading the return data received by receiver 24, performing a fast fourier transform on the received data to form frequency and amplitude data for each beam position, processing the amplitude data to detect any potential targets in the viewing angle, and estimating range and range-rate parameters of any identified targets based on the fast fourier transform frequency and amplitude data.

After each of the return amplitude values for a given sweep of the viewing angle are acquired and processed, the block 64 is executed to group the amplitude data into amplitude vs. azimuth angle profiles, similar to the graphical representation of FIG. 3. This involves categorizing contiguous return data into groups of similar range and range rate within a given tolerance or window.

Then the block 66 is executed to estimate the angle and angle extent for each amplitude vs. azimuth angle profile formed in block 64, using the sequential lobing technique according to this invention. This portion of the method is set forth in further detail in the flow diagram of FIG. 6, described below.

Thereafter, the blocks 68–72 are executed to perform target tracking based on the range, range rate, angle and angle extent of each of the identified targets determined in block 66, to select the closest in-path target, and to output its range and range-rate data to the system processor 18. The system processor, in turn, analyzes the target data to determine what, if any, vehicle response is appropriate, as explained above.

Referring now to the angle extent flow diagram of FIG. 6, the blocks 80–82 are first executed to select an amplitude vs. azimuth angle profile for processing and to determine its angle centroid. By way of example, the angle centroid for a given profile may be determined by summing the (angle × amplitude) products for the profile, and dividing that sum by a sum of the amplitudes in the profile.

If there is sufficient information to proceed, as determined at block 84, the blocks 86 and 88 are executed to read the left and right pairs of amplitude values from the selected profile, and to compute $\theta_L$ and $\theta_R$, using expressions (5)–(8), discussed above. If there is there are an insufficient number of data points in the profile to determine angle extent, block 90 is executed to set the left and right edge scatterers $\theta_L$ and $\theta_R$ equal to the angle centroid determined at block 82.

Blocks 92–98 are then executed to perform a sort of diagnostic or sense check of the determined angles $\theta_L$ and $\theta_R$. The premise of the blocks is that $\theta_L$ should never be larger than the angle centroid computed at block 82, and $\theta_R$ should never be smaller than the angle centroid. Thus, if block 92 is answered in the affirmative, $\theta_L$ is set equal to the angle centroid, and if block 96 is answered in the affirmative, $\theta_R$ is set equal to the angle centroid.

The above-described routine is repeated for each of the amplitude vs. azimuth angle profiles developed in block 64 of FIG. 5, as explained above. When all of the targets have been so processed, as determined at block 100, the signal processor 16 is returned to block 68 of FIG. 5, described above.

Figure 4:
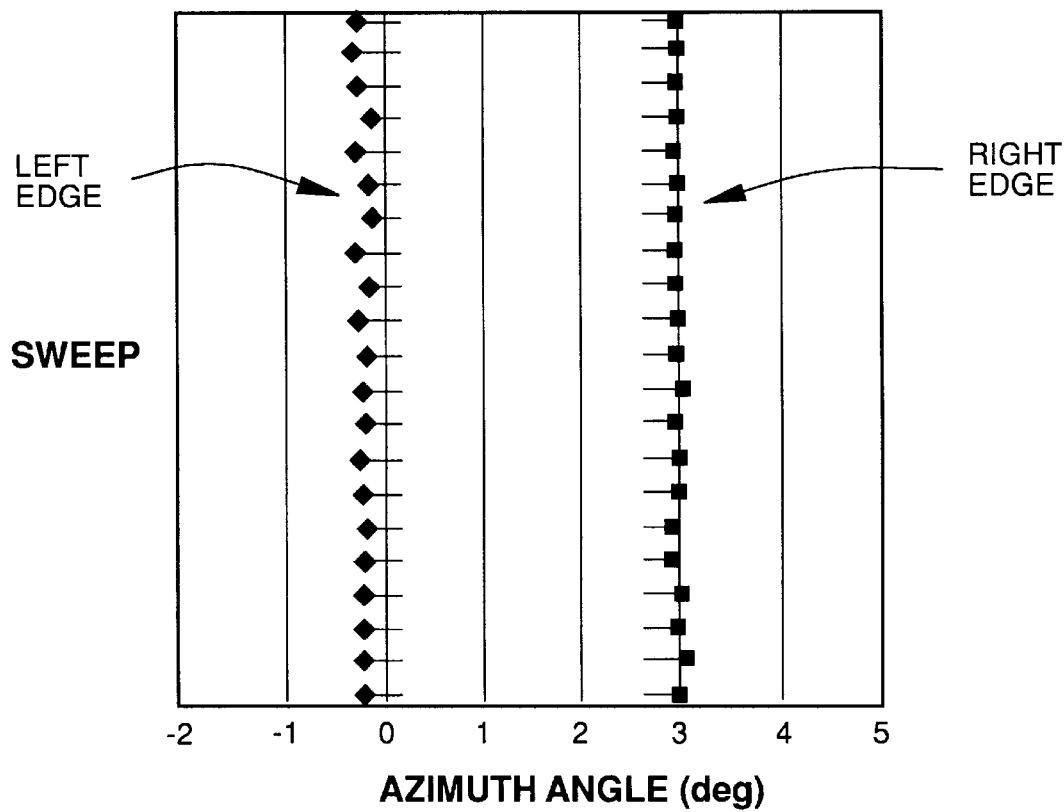
FIG. 4 graphically depicts angle extent of the composite return of FIG. 3, as determined by the method of operation of the present invention.

FIG. 4 graphically depicts the performance of object detection system 10 using the above-described control method to determine the angular extent of the composite target depicted in the amplitude vs. azimuth angle profile of FIG. 3. The determined left and right edge scatterers $\theta_L$ and $\theta_R$ are depicted for a number of successive scans of the beam 26. As seen in FIG. 4, the signal processor 16 determined the right edge scatterer $\theta_R$ (i.e, the right-hand edge of vehicle 44) to be at approximately 3 degrees, and the left edge scatterer $\theta_L$ (i.e., the motorcycle 42) to be at approximately 0 degrees. Note that the results are very consistent from scan to scan. In experimental testing with a prototype scanning sensor, the typical accuracy has been found to be approximately ±0.15 degrees in static (test range) scenarios and approximately ±0.50 degrees in dynamic (on road) scenarios, both cases involving multiple, unresolved vehicles. These results do not include smoothing, which will reduce errors due to noise, scintillation, glint, etc.

In summary, the method of operation of this invention provides a highly accurate determination of the extent of an identified target, and therefore, an accurate assessment as to whether an identified target is in or out of the vehicle travel path. Sequential lobing, normally used solely for interpolative identification of a point source scatterer, is used in an extrapolative manner according to this invention for identifying edge scatterers associated with peripheral data of a return grouping, thereby providing an accurate estimate of the lateral extent of a target.

While this invention has been described in reference to the illustrated embodiment, it is expected that various modifications in addition to those suggested above will occur to those skilled in the art. In this regard, it will be understood that the scope of this invention is not limited to the illustrated embodiment, and that systems incorporating such modifications may fall within the scope of this invention, which is defined by the appended claims.

The embodiments of the invention in which an exclusive property or privilege in claimed are defined as follows:

What is claimed is:

1. In a motor vehicle object detection system having a sensor beam which is scanned back and forth through a viewing angle including a vehicle travel path, the system processing reflected beam energy to detect and respond to objects disposed in the travel path, a method of determining angular extent of an object comprising the steps of:

processing energy return data from one or more complete scans of said sensor beam to identify objects in the viewing angle and to form an array of return amplitude data associated with successive beam positions for each identified object;

selecting a first pair of return amplitude data associated with successive beam positions at a left-most edge of a selected array of return amplitude data, including left-most and next-to-left-most amplitude values;

computing an angle of a point source scatterer which would be responsible for said first pair of return amplitude data by computing an amplitude ratio of said next-to-left-most amplitude value and said left-most amplitude value, and storing such angle as a left extent angle of a respective identified object;

selecting a second pair of return amplitude data associated with successive beam positions at a right-most edge of the selected array;

computing an angle of a point source scatterer which would be responsible for said second pair of return amplitude data, and storing such angle as a right extent angle of a respective identified object; and determining the overall extent angle of the respective identified object as an angle defined by the stored left and right extent angles.

2. The method of claim 1, wherein step of computing an angle of a point source scatterer which would be responsible for said first pair of return amplitude data further includes the steps of:

computing a scatterer angle as a function of said amplitude ratio; and offsetting the computed scatterer angle by an angle value midway between sensor beam positions associated with said left-most and next-to-left-most amplitude values.

3. In a motor vehicle object detection system having a sensor beam which is scanned back and forth through a viewing angle including a vehicle travel path, the system processing reflected beam energy to detect and respond to objects disposed in the travel path, a method of determining angular extent of an object comprising the steps of:

processing energy return data from one or more complete scans of said sensor beam to identify objects in the viewing angle and to form an array of return amplitude data associated with successive beam positions for each identified object;

selecting a first pair of return amplitude data associated with successive beam positions at a left-most edge of a selected array of return amplitude data, and storing such angle as a left extent angle of a respective identified object;

selecting a second pair of return amplitude data associated with successive beam positions at a right-most edge of the selected array including right-most and next-to-right-most amplitude values;

computing an angle of a point source scatterer which would be responsible for said second pair of return amplitude data by computing a ratio of said next-to-right-most amplitude value and said right-most amplitude value, and storing such angle as a right extent angle of a respective identified object; and determining the overall extent angle of the respective identified object as an angle defined by the stored left and right extent angles.

4. The method of claim 3, wherein step of computing an angle of a point source scatterer which would be responsible for said first pair of return amplitude data further includes the steps of:

computing a scatterer angle as a function of said amplitude ratio; and offsetting the computed scatterer angle by an angle value midway between sensor beam positions associated with said left-most and next-to-left-most amplitude values.

5. A method of operation for a motor vehicle object detection system having a sensor beam which is scanned back and forth through a viewing angle including a vehicle travel path angle, comprising the steps of:

receiving reflected beam energy data from one or more complete scans of said sensor beam;

processing said data to identify objects disposed in the viewing angle;

forming an array of reflected beam energy amplitude data associated with successive beam positions for any identified object; and for a selected array of amplitude data, obtaining a first pair of amplitude data points associated with successive beam positions at a left-most edge of the selected array including left-most and next-to-left-most amplitude values;

computing an angle of a point source scatterer which would be responsible for said first pair of amplitude data points by computing an amplitude ratio of said next-to-left-most amplitude value and said left-most amplitude value, and storing such angle as a left extent angle of the respective identified object;

obtaining a second pair of amplitude data points associated with successive beam positions at a right-most edge of the selected array;

computing an angle of a point source scatterer which would be responsible for said second pair of amplitude data points, and storing such angle as a right extent angle of the respective identified object;

determining the overall extent angle of the respective identified object as an angle defined by the stored left and right extent angles;

identifying an in-path object based on a coincidence of the determined overall extent angle and the vehicle travel path angle; and initiating a vehicle action in response to identification of an in-path object.

6. The method of claim 5, wherein step of computing an angle of a point source scatterer which would be responsible for said first pair of amplitude data points further includes the steps of:

computing a scatterer angle as a function of said amplitude ratio; and offsetting the computed scatterer angle by an angle value midway between sensor beam positions associated with said left-most and next-to-left-most amplitude values.

7. A method of operation for a motor vehicle object detection system having a sensor beam which is scanned back and forth through a viewing angle including a vehicle travel path angle, comprising the steps of;

receiving reflected beam energy data from one or more complete scans of said sensor beam;

processing said data to identify objects disposed in the viewing angle;

forming an array of reflected beam energy amplitude data associated with successive beam positions for any identified object; and for a selected array of amplitude data, obtaining a first pair of amplitude data points associated with successive beam positions at a left-most edge of the selected array;

computing an angle of a point source scatterer which would be responsible for said first pair of amplitude data points, and storing such angle as a left extent angle of the respective identified object;

obtaining a second pair of amplitude data points associated with successive beam positions at a right-most edge of the selected array including right-most and next-to-right-most amplitude values;

computing an angle of a point source scatterer which would be responsible for said second pair of amplitude data points by computing a ratio of said next-to-right-most amplitude value and said right-most amplitude value, and storing such angle as a right extent angle of the respective identified object;

determining the overall extent angle of the respective identified object as an angle defined by the stored left and right extent angles;

identifying an in-path object based on a coincidence of the determined overall extent angle and the vehicle travel path angle; and initiating a vehicle action in response to identification of an in-path object.

8. The method of claim 7, wherein the step of computing an angle of a point source scatterer which would be responsible for said second pair of amplitude data points further includes the steps of:

computing a scatterer angle as a function of said amplitude ratio; and offsetting the computed scatterer angle by an angle value midway between sensor beam positions associated with said right-most and next-to-right-most amplitude values.

* * * * *